UNITED STATES PATENT OFFICE.

CARRIE BARNES INNES, OF PARIS, KENTUCKY.

ALTERATIVE TONIC.

SPECIFICATION forming part of Letters Patent No. 413,233, dated October 22, 1889.

Application filed March 29, 1889. Serial No. 305,276. (No specimens.)

*To all whom it may concern:*

Be it known that I, CARRIE BARNES INNES, a citizen of the United States, residing at Paris, in the county of Bourbon and State of Kentucky, have invented certain new and useful Improvements in Alterative Tonics; and I do hereby declare the following to be a full, clear, and exact description of the invention, such as will enable others skilled in the art to which it appertains to make and use the same.

My invention relates to the preparation of a remedy which is especially intended for the purpose of a tonic, the object of which is to so act upon the organs of nutrition and secretion that a stimulating effect will be imparted thereto, resulting in a thorough and effective action of such organs, thereby purifying the blood. The roots only of the following-named plants and trees are first thoroughly cleaned and separately boiled in water, using one ounce of the fresh root to one-half gallon of water, and the resulting product is referred to below by the term "decoction extract," and this explanation is for the purpose of making known the exact meaning of such term.

My preparation is intended more especially for the treatment of blood and cutaneous diseases, and consists of the following-named ingredients, to which I append the proper proportions of each, together with the manner of preparing the same, to wit: decoction extract of blackberry-root, (*Rubus*,) one and one-half pint; decoction extract of poke-root, (*Phytolacca*,) one and one-half pint; decoction extract of burdock-root, (*Lappa*,) one and one-half pint; decoction extract of sarsaparilla-root, (*Smilax*,) three pints; decoction extract of silk-weed root, (*Asclepias*,) one and one-half pint; decoction extract of May-apple root, (*Podophyllum peltatum*,) one and one-half pint; decoction extract of wild-cherry root, (*Prunus virg.*,) one and one-half pint; decoction extract of horehound, (*Marrubium*,) one and one-half pint; decoction extract of hops, (*Humulus lupulus*,) one and one-half pint.

The decoctions of the above ingredients are to be thoroughly mixed and then added to one gallon of whisky or brandy, and after standing twenty-four hours it is ready for use in the following-named doses, to wit: for adults, three teaspoonfuls three times each day; for infants, one teaspoonful three times each day, to be continued as long as a tonic effect is desired.

What I claim is—

The herein-described alterative tonic or remedy for blood and cutaneous diseases, consisting of blackberry, poke, burdock, sarsaparilla, silk-weed, May-apple, and wild-cherry roots, horehound, hops, and spirits, in the proportions specified.

In testimony whereof I affix my signature in presence of two witnesses.

CARRIE BARNES INNES.

Witnesses:
P. M. MILLER,
F. R. ANNESBURG.